United States Patent [19]

Okita et al.

[11] Patent Number: 4,679,106
[45] Date of Patent: Jul. 7, 1987

[54] SPRING LOADED EJECTOR FOR DISC CARTRIDGE

[75] Inventors: Masao Okita, Furukawa; Kunihiko Gunji, Tajiri; Yukio Saito, Furukawa, all of Japan

[73] Assignee: Alps Electric Co., Ltd., Japan

[21] Appl. No.: 930,035

[22] Filed: Nov. 10, 1986

Related U.S. Application Data

[63] Continuation of Ser. No. 626,316, Jun. 29, 1984, abandoned.

[30] Foreign Application Priority Data

Jun. 29, 1983 [JP] Japan .............................. 58-99335[U]

[51] Int. Cl.⁴ ...................... G11B 5/012; G11B 5/016; G11B 23/03
[52] U.S. Cl. ....................................... 360/99; 360/97; 360/133
[58] Field of Search ................................. 360/97-99, 360/105, 133, 137, 96.5, 86

[56] References Cited

U.S. PATENT DOCUMENTS

| 3,940,147 | 2/1976 | Hunt et al. | 360/86 |
| 4,419,703 | 12/1983 | Gruczelak et al. | 360/97 |
| 4,511,944 | 4/1985 | Saito | 360/97 |
| 4,546,397 | 10/1985 | Asami et al. | 360/133 |
| 4,562,498 | 12/1985 | Shibata | 360/97 |
| 4,573,093 | 2/1986 | Obama et al. | 360/97 |
| 4,587,585 | 5/1986 | Shimaoka et al. | 360/133 |

FOREIGN PATENT DOCUMENTS

| 0157588 | 10/1985 | European Pat. Off. | 360/99 |
| 55-42311 | 3/1980 | Japan | 360/133 |
| 58-14368 | 1/1983 | Japan | 360/97 |
| 58-108055 | 6/1983 | Japan | 360/97 |
| 58-102361 | 6/1983 | Japan | 360/133 |
| 2105091 | 3/1983 | United Kingdom | 360/97 |

Primary Examiner—John H. Wolff
Assistant Examiner—Alfonso Garcia
Attorney, Agent, or Firm—Guy W. Shoup

[57] ABSTRACT

In a recording and reproducing device to be used with a disc cartridge, a cartridge holder receives the disc cartridge when it is inserted, and moves between an ejecting position and a load position. An eject lever supported by the cartridge holder is rotated when the leading edge of the disc cartridge is brought into contact with an end of the eject lever, and a spring member is provided in combination with the eject lever for urging the eject lever in a direction removing the disc cartridge out of the cartridge holder.

3 Claims, 7 Drawing Figures

SPRING LOADED EJECTOR FOR DISC CARTRIDGE

This is a continuation application from application Ser. No. 626,316 filed June 29, 1984 now abandoned.

BACKGROUND OF THE INVENTION

This invention relates to a recording and reproducing device to be used with a disc cartridge of a magnetic type, and more particularly to a recording and reproducing device including an ejecting mechanism for the disc cartridge.

Heretofore a recording and reproducing device to be used with a disc cartridge wherein the disc cartridge is firstly inserted into a cartridge holder placed in an ejecting position, and the cartridge holder thus containing the disc cartridge is then brought into a loading position where the disc cartridge is recorded or reproduced has been widely known.

Such a conventional recording and reproducing device ordinarily includes an ejecting mechanism comprising an electric motor combined with a speed reduction mechanism, so that the torque of the electric motor is utilized for ejecting the disc cartridge out of the recording and reproducing device. However since the provision of the speed reduction mechanism and else is found to be disadvantageous because of its complicated construction and increased size, there has been proposed a simplified construction of the ejecting mechanism wherein an ejecting lever combined with a coil spring is mounted on a frame and rotated by an end of the inserted disc cartridge so as to store the energy which is thereafter utilized for ejecting the disc cartridge out of the recording and reproducing device. The proposed construction substantially simplifies the ejecting mechanism because no complicated speed reduction mechanism and else are required. However, since the disc cartridge is such an ejecting mechanism moves together with a cartridge holder relative to the eject lever supported by the frame, a large frictional resistance is created between the eject lever storing energy and the disc cartridge, thus entailing another disadvantageous feature of rendering the insertion and removal of the disc cartridge to be difficult. Furthermore, securing the eject lever and the cartridge holder relatively movable to their correct positions have been found troublesome.

SUMMARY OF THE INVENTION

An object of the present invention is to provide a recording and reproducing device to be used with a disc cartridge wherein the above described difficulties of the conventional device can be substantially eliminated.

Another object of the invention is to provide a recording and reproducing device to be used with a disc cartridge wherein the insertion and removal of the disc cartridge can be carried out smoothly, and assembling of the device can be substantially simplified.

These and other objects of the present invention can be achieved by a recording and reproducing device to be used with a disc cartridge characterized in that the device comprises a cartridge holder receiving the disc cartridge and movable between an ejecting position and a load position, an eject lever supported rotatably by the cartridge holder so that the eject lever is contactable with a leading edge of the disc cartridge, and a spring member urging the eject lever in a direction along which the disc cartridge is removed out of the cartridge holer.

DESCRIPTION OF THE PREFERRED EMBODIMENT

Figure 1:
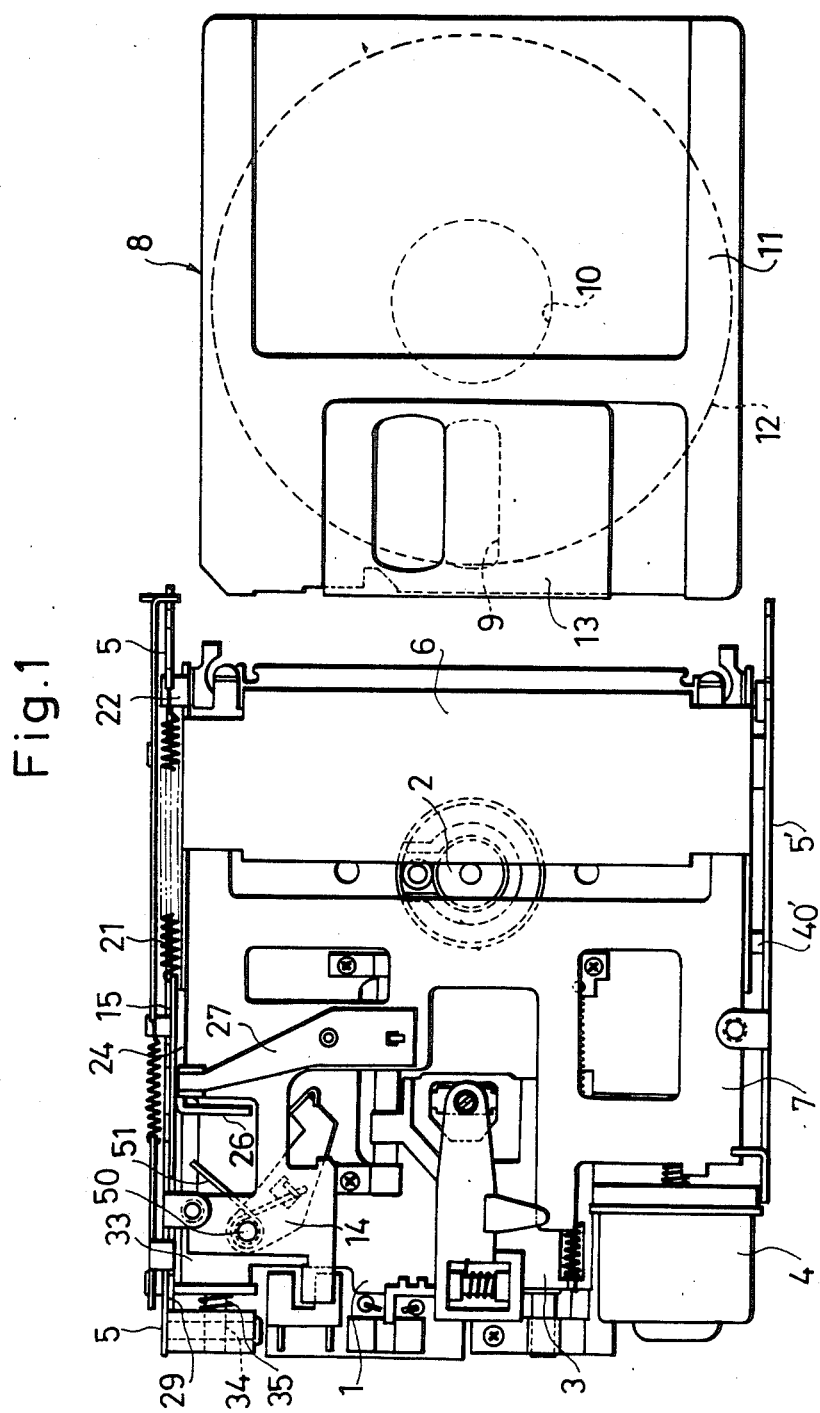
FIG. 1 is a plan view of a recording and reproducing device according to a preferred embodiment of the present invention, while a disc cartridge is indicated outside of the device.

A preferred embodiment of the present invention will now be described with reference to FIG. 1. The embodiment generally comprises a frame 1 on which are provided a disc rotating shaft 2, a carriage 3 for supporting a magnetic head and a pad, a stepping motor 4 and else. On both sides of the frame 1, side plates 5 and 5' are provided to be secured to the frame 1 by means of screws. Internally of the side plates, a cartridge holder 7 is provided over a load lever 6 so that the holder 7 is held above the disc rotating shaft 2. Although it is not shown in the drawing, a cartridge inserting port is provided on the right side of the cartridge holder 7 as viewed in FIG. 1, and a magnetic disc cartridge 8 is inserted through the cartridge inserting port toward the carriage 3. The magnetic disc cartridge 8 comprises a case 11 made of a hard synthetic resin and provided with a magnetic head inserting hole 9 and a rotating shaft inserting hole 10, a magnetic disc 12 held freely rotatably within the case 11, a shutter plate 13 covering the magnetic head inserting hole 9 of the case 11 and the like. On the cartridge holder 7 extending between the side plate 5 and the carriage 3 is provided an eject lever 14 which stores a disc cartridge ejecting force at a time when the shutter plate 13 opens.

Figure 2:
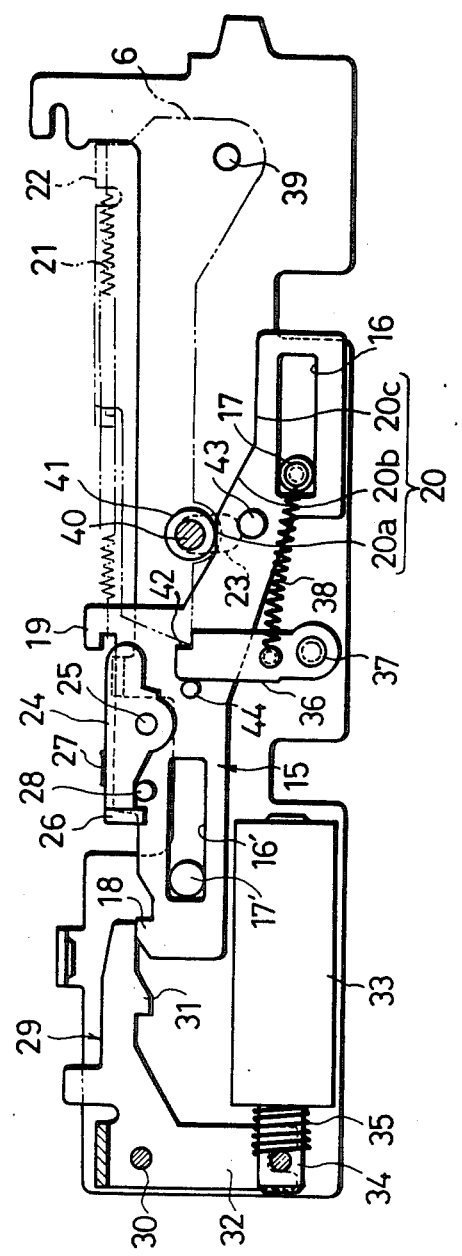
FIGS. 2 and 3 are side views to be used for explaining the operation of a cam plate.
Figure 3:
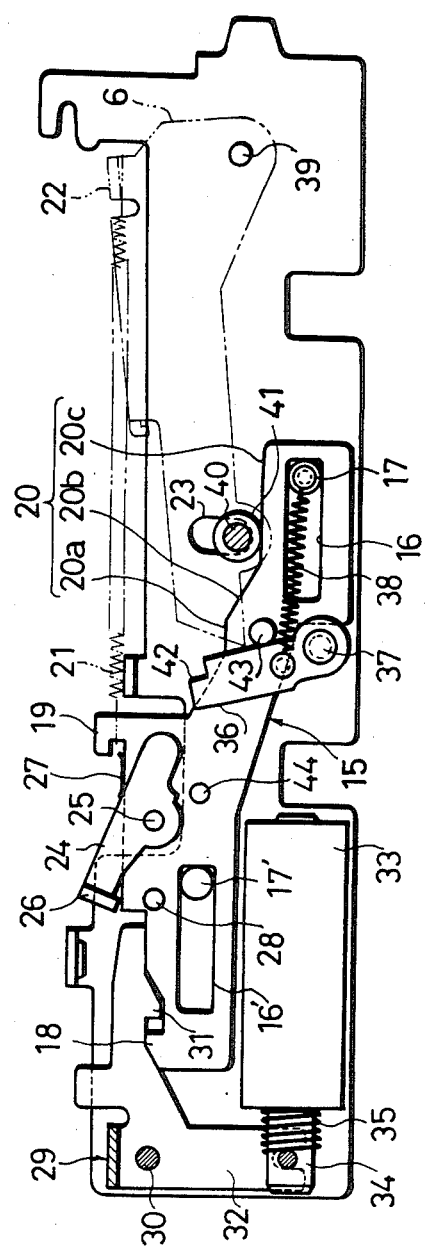

Internally of the side plate 5, a cam plate 15 is provided to be slidable along the lengthwise direction. More specifically, two elongated holes 16 and 16' are provided in the cam plate 15 as shown in FIGS. 2 and 3. Two pins 17 and 17' projecting from the side plate 5 are extended through the elongated holes 16 and 16' respectively so as to support the cam plate 15 in the slidable manner. An engaging projection 18 is formed at an end of the came plate 15, while a spring seizing projection 19 and a portion 20 operable as a cam are provided in an intermediate part of the cam plate 15. One end of a tension spring 21 is held by the spring seizing projection 19, while the other end of the tension spring 21 is held by a spring seizing portion 22 formed on the load lever 6. Under the tension of the tension spring the cam plate 15 is continuously urged to the inlet side (right side) of the recording and reproducing device. The portion 20 operable as a cam comprises an upper flat portion 20a, a tapered portion 20b and a lower flat portion 20c. A vertically elongated hole 23 is formed through a part of the side plate 5 opposing to the cam portion 20, while another vertically elongated hole (not shown) similar to the hole 23 is formed through the similar part of the other side plate 5'.

Near the central part of the upper edge of the cam plate 15 is provided a rotatable lever 24 which is supported rotatably by a pivot shaft 25. An end of the rotatable lever 24 is bent inwardly so as to form an abutting portion 26 abutting with the leading edge of the magnetic disc cartridge 8. Numeral 27 designates a depressing plate made of a resilient material, one end of the depressing plate 27 being secured to the upper surface of the cartridge holer 7, while the other end of the depressing plate 27 urges the rotatable lever 24 downwardly. Numeral 28 designates a stopper formed by a projecting part of the cam plate 15. The stopper 28 restricts the rotation of the rotatable lever in excess of the horizontal position.

In response to the operation of the cam plate 15, a lock lever 29 is rotated around a pivot pin 30 projecting inwardly from the side plate 5. One end of the lock lever 29 is formed into an engaging portion 31 that is engageable with the engaging projection 18 provided at an end of the cam plate 15, while the other end of the lock lever 29 bent inwardly is connected at 32 with an armature 34 of an electromagnetic solenoid 33. The lock lever 29 is urged by a coil spring 35 provided around the armature 34 to be rotated around a pivot pin 30 in the engaging direction of the engaging portion 31 and the engaging projection 18. Internally of a central portion of the side plate 5 is provided a lock member 36 to be rotatable around a pivot pin 37. A coil spring 38 is extended between the lock member 36 and the pin 17 inserted into the elongated hole 16 so that the lock member 36 is urged by the coil spring 38 toward the inlet port of the cartridge.

Figure 4:
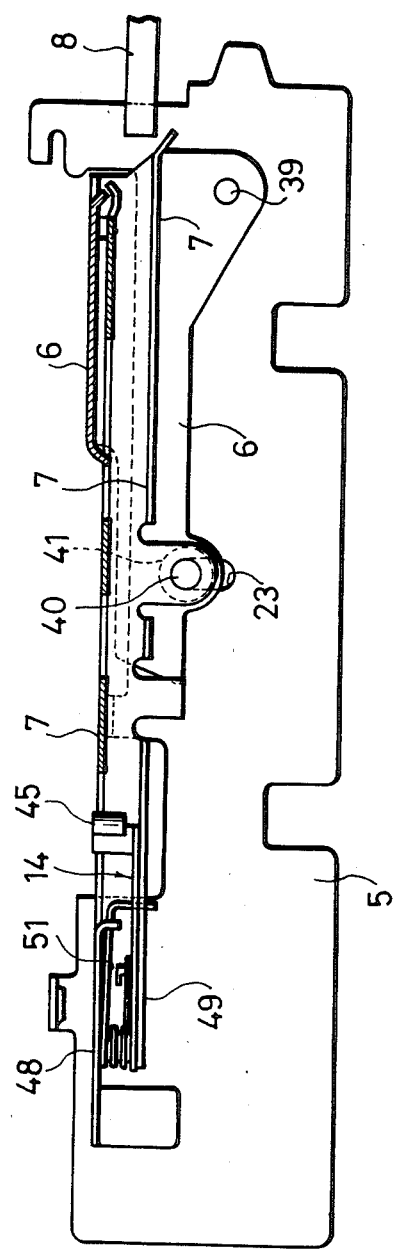
FIGS. 4 and 5 are side views, partly in section, useful for explaining the operation of a cartridge holder.
Figure 5:
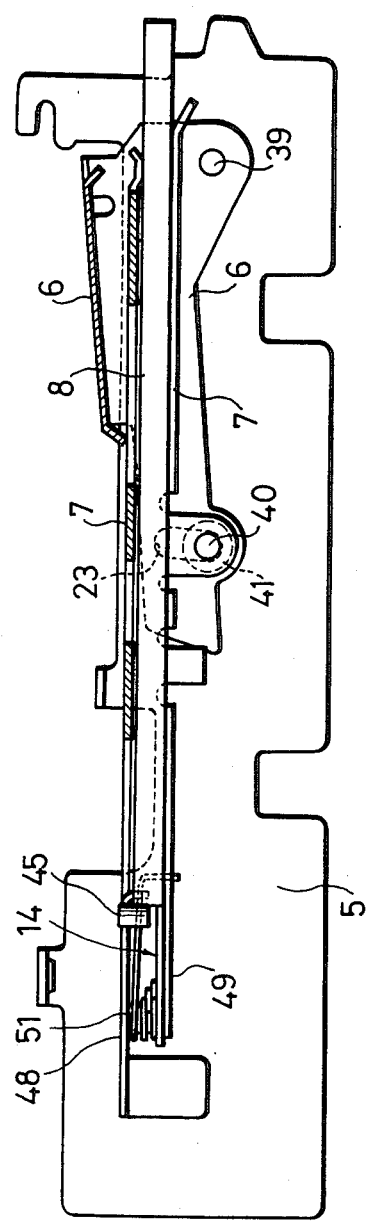

The aforementioned load lever 6 is supported by pivot pins 39, 39 projecting from the two side plates 5 and 5' so as to be rotatable around the pivot pins 39, 39. Under the tension of the tension spring 21, the load lever 6 is urged around the pivot pins 39, 39 toward the downward load position. The load lever 6 is rotatably connected with the cartridge holder 7 through connecting pins 40 and 40' that are inserted through the vertically elongated holes 23, 23 provided through the side plates 5 and 5', as best illustrated in FIGS. 4 and 5. A roller 41 contactable with the cam portion 20 of the cam plate 15 is loosely inserted around the pin 40. An end of the load lever 6 away from the inlet port of the cartridge is formed to be engageable with a stepped portion 42 formed at an end of the lock member 36. With the lever 6 and the lock member 36 thus engaged, the rotation of the load lever 6 is blocked and the cartridge holder 7 is held at the eject position. A release pin 43 for releasing the engagement between the load lever 6 and the stepped portion 42 when the pin 43 abuts against the lock member 36 is provided to project from the cam plate 15. Likewise, a projecting portion 44 for resuming the engagement between the load lever 6 and the stepped portion 42 projects integrally from the cam plate 15.

Figure 6:
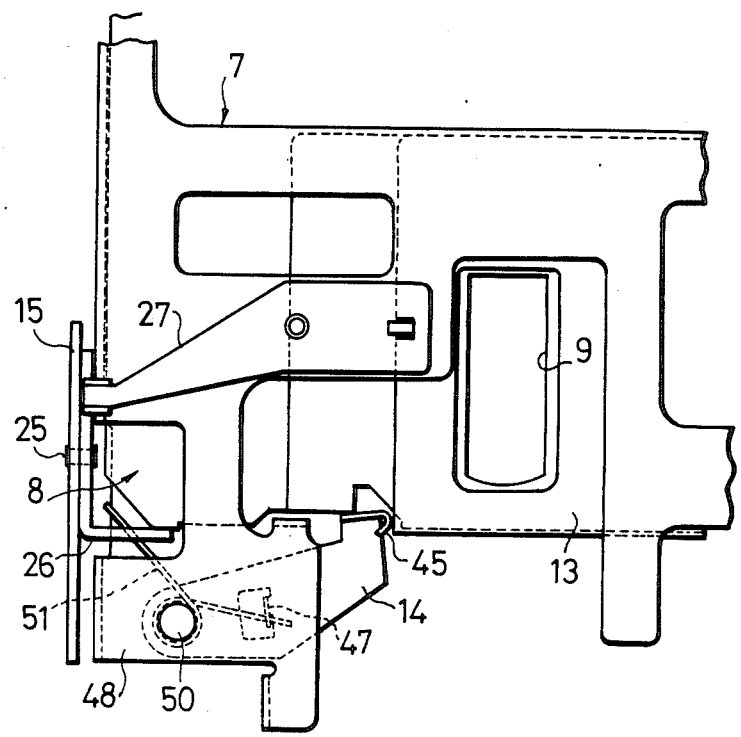
FIG. 6 is a plan view to be used for explaining the operation of an eject lever.
Figure 7:
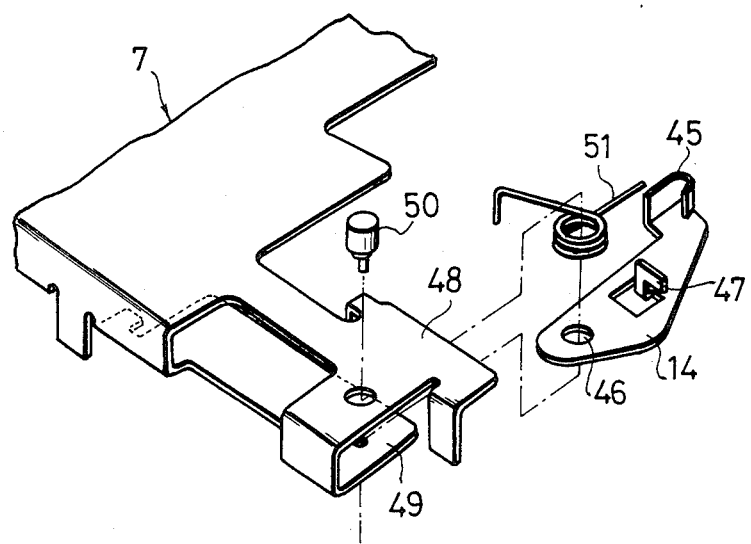
FIG. 7 is an exploded perspective view showing the eject lever and associated members.

As shown in FIGS. 6 and 7, the aforementioned eject lever 14 made of a metal plate has an end bent formed to provide an abutting portion 45, a through hole 46 provided at the other end, and a spring holding projection 47 rising up from an intermediate portion of the inject lever 14. The eject lever 14 is provided between an upper surface portion 48 of the cartridge holder 7 and a lower surface portion 49 bent formed out of the same, and is supported freely rotatably by a pivot shaft 50 which is secured to the cartridge holder 7 for instance by caulking. A torsional coil spring 51 is provided around the pivot shaft 50. One end of the torsional coil spring 51 is held by the spring holding portion 47 of the eject lever 14 while the other end thereof is held by the lower surface portion 49 of the cartridge holder 7. In this manner the eject lever 14 is constantly urged by the torsion spring 51 toward the inlet side port.

The operation of the recording and reproducing device for inserting the magnetic disc cartridge will now be described.

As described hereinbefore, FIGS. 1, 2 and 4 illustrate a condition of the recording and reproducing device before the disc cartridge is inserted into the same. In this state, the cam plate 15 is displaced under the force of the tension spring 21 to the inlet port side as shown in FIG. 2, so that the upper flat portion 20a of the cam plate 15 is brought into a position opposing to the vertically elongated hole 23 of the side plate 5. Thus the roller 41 loosely inserted around the connecting pin 40 rides on the upper flat portion 20a of the cam plate 15 so as to inhibit downward rotation of the load lever 6, and the cartridge holer 7 is thereby held in the stand-by or inject position as shown in FIG. 4.

In the state the solenoid 33 is not energized and therefore the lock lever 29 abuts against the cam plate 15 under the force of the spring 35. Since the cam plate 15 is held in the position near the inlet port, the engaging portion 31 of the lock lever 29 is not engaged with the engaging projection 18 of the cam plate 15. An end of the load lever 6 away from the inlet port is held by the stepped portion 42 of the lock member 36 so as to prevent downward rotation of the load lever 6. The abutting portion 45 of the eject lever 14 is brought into a position nearer to the inlet port as shown in FIG. 1, while an end of the depressing plate 27 depresses the rotatable lever 24 at an intermediate position thereof between the pivot shaft 25 and the abutting portion 26 so as to urge the rotatable lever 24 toward the stopper 28 as shown in FIGS. 1 and 2.

When the magnetic disc cartridge 8 is inserted in this state into the cartridge holder 7, the abutting portion 45 of the eject lever 14 abuts against the leading edge of the shutter 13 provided on the cartridge. According to further insertion of the cartridge 8, the eject lever 14 rotates in the clockwise direction as viewed in FIG. 1, so that the coil spring 51 stores a part of energy used for inserting the cartridge. At the same time, the shutter 13 opens in accordance with the rotation of the eject lever 14 to expose the magnetic head inserting port 9 (see FIG. 6).

During the insertion of the disc cartridge 8, the forward edge of the cartridge 8 abuts against the abutting portion 26 of the rotatable lever 24, so that the cam plate 15 is shifted by the inserting force of the cartridge 8 toward the lock lever 29 against the force of the tension spring 21. The engaging projection 18 of the cam plate 15 pushes up the engaging portion 31 of the lock lever 29 to be brought into engagement with the engaging portion 31. The engagement between the projection 18 and the engaging portion 31 locks the cam plate 15 so that the cam plate 15 does not go back to the original position. According to the forward shift of the cam plate 15, the tapered portion 20b of the cam plate 15 opposes the vertically elongated hole 23 provided through the side plate 5, and at a position where the cam plate 15 is locked by the lock lever 29, the lower end of the tapered portion 20b opposes the elongated hole 23. At the time when the cam plate 15 is thus locked, the forward end of the load lever 6 is still supported by the stepped portion 42 of the lock member 36, and hence the load lever 6 cannot be rotated downwardly. As a consequence the cartridge holder 7 connected with the load lever 6 through the connecting pins 40 and 40' is yet held at the eject position as shown in FIG. 4. Thus the roller 41 loosely inserted around the connecting pin 40 is held in an upper part of the vertically elongated hole 23 in a spaced apart relation from the tapered portion 20b.

When the magnetic disc cartridge 8 is further inserted after the cam plate 15 has been locked as described above, the release pin 43 abuts against the lock member 36 causing the lock member 36 to rotate counterclockwise as viewed in FIG. 3, so that the forward end of the load lever 6 is disengaged from the stepped portion of the lock member 36. The disengagement of the load lever 6 permits the rotation of the lever 6 around the pivot pin 39 under the action of the tension spring 21 in counter-clockwise direction as viewed in FIG. 3. As a consequence the connecting pins 40 and 40' are allowed to descend together with the roller 41 within the vertically elongated hole 23, so that the cartridge holer 7 is thereby descended to the load position having the disc rotating shaft 2 as shown in FIG. 5. The magnetic disc cartridge 8 is thus correctly positioned so that it is prepared for the recording and reproducing operation.

At this time, since the eject lever 14 is supported by the cartridge holder 7, the cartridge holder 7, disc cartridge 8 and the eject lever 14 are descended simultaneously, causing no friction between the disc cartridge 8 and the eject lever 14. The disc cartridge 8 is thus permitted to be brought into the load position without frictional resistance. In the load position, the depressing plate 27 abuts against the rotatable lever 24 on the side of the pivot shaft 25 nearer to the inserting port of the disc cartridge. Thus the rotatable lever 24 is rotated in accordance with the lowering of the cartridge holder 7 around the pivot shaft 25 in clockwise direction as viewed in FIG. 3, so that the abutting portion 26 of the rotatable lever 24 departs from the leading edge of the disc cartridge 8. Upon completion of loading of the disc cartridge 8, the roller 41 of the pin 40 is held in contact with the lower flat portion 20c of the cam plate 15.

Operation for ejecting the disc cartridge 8 out of the recording and reproducing device of this invention will now be described. When the solenoid 33 is energized under the control of an ejecting signal from a control device (not shown), armature 34 is pulled into the solenoid against the force of the coil spring 35. The lock lever 29 is thus rotated counter-clockwisely as shown in FIG. 3 thereby to disengage the engaging portion 31 out of the engaging projection 18 of the cam plate 15. Cam plate 15 is thus pulled back by the force of the tension spring 21 toward the inlet port. The rearward shift of the cam plate 15 moves the roller 41 along the tapered portion 20b upward so that the roller 41 is finally brought into contact with the upper flat portion 20a as shown in FIG. 2. As a consequence, the load lever 6 is rotated upward against the force of the tension spring 21 to a position engaging with the stepped portion 42 of the lock member 36 that has been brought back to the initial position by means of the coil spring 38 and the projection 44. The cartridge holder 7 containing the disc cartridge 8 is thus lifted from the load position to the ejecting position. When the cartridge holder 7 is thus lifted, the eject lever 14 supported by the cartridge holder 7 is also lifted together with the cartridge holder 7. In this case also, no frictional force is created between the disc cartridge 8 and the eject lever 14 so that the magnetic disc cartridge 8 is shifted smoothly toward the ejecting position. When the cartridge 8 is lifted to the ejecting position, the disc cartridge 8 is ejected out of the cartridge holder 7 due to the action of the stored torque in the eject lever 14 and the backward shift of the rotatable lever 24 mounted on the cam plate 15. When the disc cartridge 8 is ejected, the shutter 13 on the cartridge 8 is moved by a spring means not shown toward the closing position as shown in FIG. 1 thereby closing the magnetic head inserting port 9. At this time the depressing plate 27 is placed between the pivot shaft 25 and the abutting portion 26 of the rotatable lever 24, so that the rotatable lever 24 is urged in a direction abutting against the stopper 28. As a consequence the device is now ready for receiving another disc cartridge 8.

Although in the above description the eject lever 14 is made of a metal plate, it is apparent that the material is not necessarily restricted to the metal plate, but any suitable synthetic resin may otherwise be utilized for producing the eject lever.

According to the present invention, since the eject lever provided to abut against the disc cartridge is supported to be movable with the cartridge holder, when the cartridge holder is shifted between the ejecting position and the load position, three members of the cartridge holder, disc cartridge and the eject lever are moved as if an integrally combined unit so that any frictional force tending to be created between the torque storing eject lever and the disc cartridge can be eliminated completely. As a consequence, the insertion and removal of the disc cartridge can be carried out smoothly, and furthermore, since the cartridge holder beforehand combined with the eject lever and the coil spring may be assembled with other members, the assembling work of the recording and reproducing device can be substantially simplified.

What is claimed is:

1. In a recording and reproducing device using a disk cartridge of the type having a case with a front end to be inserted in the recording and reproducing device, a magnetic disk enclosed in the case, a magnetic head insertion hole in an upper wall at the front end of the case for exposing the magnetic disk to a magnetic head in the recording and reproducing device, and a shutter plate at the front end of the case covering the hole at a covering position which is movable in one sidewards direction to an uncovered position to expose the insertion hole when the disk cartridge is inserted in the recording and reproducing device, and plate biasing means connected to the shutter plate for returning it to the covered position when the cartridge is removed from the recording and reproducing device, and the recording and reproducing device being of the type having a frame with a front insertion slot for the disk cartridge, a cartridge holder mounted in the frame for receiving a disk cartridge inserted therein at an eject position, loading means for moving the cartridge holder to a loaded position when the cartridge has been inserted to a fully inserted position in the holder, holding means for holding the cartridge holder in the loaded position, a magnetic head positionable through the insertion hole of the cartridge at the loaded position for recording on and reproducing from the disk, and releasing means for releasing the cartridge holder from the loaded position to the eject position when the cartridge is to be ejected from the frame, the improvement comprising a single eject lever supported rotatably at a rear position inside the cartridge holder having an abutting portion which is positioned to abut against a portion of the shutter plate as the cartridge is inserted in the holder, said abutting portion remaining engaged with said shutter plate as said cartridge continues to be inserted in the holder to the fully inserted position and said lever rotating therewith in a direction corresponding to the resulting movement of the shutter plate in said sidewards direction to the uncovered position so as to expose said insertion hole in the cartridge, wherein said magnetic head can be positioned in said insertion hole when said cartridge holder is moved by said loading means to the loaded position, and a spring member mounted with the eject lever for biasing it with a stored spring force as it is rotated by insertion of the cartridge to the fully inserted position so as to provide a returning force for rotating the eject lever in the direction for ejecting the cartridge from the holder when the holder is released by said releasing means from the loaded position to the eject position, whereby said single eject lever and spring member obtains both the functions of opening the shutter plate of the disk cartridge and ejecting the cartridge from the holder, while being movable with the cartridge and holder between the eject and loaded positions so as to avoid frictional forces with other parts of the recording and reproducing device.

2. A recording and reproducing device as set forth in claim 5 wherein said eject lever is made of a planar material with an end thereof bent formed to provide an abutting portion, a through hole provided at the other end, and a spring holding projection rising up from an intermediate portion.

3. A recording and reproducing device as set forth in claim 1 or 2, wherein said eject lever is arranged between an upper surface portion of said cartridge holder and a lower surface portion formed by bending an end of said cartridge holder downwardly, and said eject lever is loosely inserted around a pivot pin secured to said cartridge holder by caulking.

* * * * *